United States Patent [19]
Miyamoto et al.

[11] Patent Number: 5,845,011
[45] Date of Patent: Dec. 1, 1998

[54] IMAGE PROCESSING APPARATUS FOR COMPRESSING IMAGE DATA ACCORDING TO AN ENLARGEMENT RATIO OF AN ENLARGED IMAGE DATA

[75] Inventors: Ryosuke Miyamoto, Ichikawa; Nobuyuki Suzuki, Yokohama, both of Japan

[73] Assignee: Canon Kabushiki Kaisha, Tokyo, Japan

[21] Appl. No.: 521,012

[22] Filed: Aug. 30, 1995

Related U.S. Application Data

[63] Continuation of Ser. No. 113,437, Aug. 27, 1993, abandoned.

[30] Foreign Application Priority Data

Sep. 1, 1992 [JP] Japan ................................ 4-233617
Aug. 27, 1993 [JP] Japan ................................ 5-213004

[51] Int. Cl.$^6$ .............................. G06K 9/36; G06K 9/46; G06K 9/32; H04N 5/262
[52] U.S. Cl. ........................ 382/232; 382/298; 348/240; 348/390
[58] Field of Search ................................ 348/240, 420, 348/384, 390, 405, 581, 704; 358/335, 906, 426; 382/232, 233, 235, 298; 345/202; 364/715.02

[56] References Cited

U.S. PATENT DOCUMENTS

| 4,782,397 | 11/1988 | Kimoto ................................ 358/256 |
| 4,791,680 | 12/1988 | Yokoe et al. ........................ 382/298 |
| 4,963,981 | 10/1990 | Todaka et al. .................. 358/213.13 |
| 5,016,107 | 5/1991 | Sasson et al. ..................... 358/209 |
| 5,216,503 | 6/1993 | Paik et al. ......................... 358/133 |
| 5,216,516 | 6/1993 | Tanaka et al. ..................... 358/426 |
| 5,276,515 | 1/1994 | Katsumata et al. ............... 358/160 |
| 5,402,171 | 3/1995 | Tagami et al. .................... 348/219 |

FOREIGN PATENT DOCUMENTS

| A0246010 | 11/1987 | European Pat. Off. ........ G06F 15/62 |
| A0541092 | 5/1993 | European Pat. Off. ........ H04N 5/232 |

*Primary Examiner*—Bipin Shalwala
*Attorney, Agent, or Firm*—Morgan & Finnegan LLP

[57] ABSTRACT

An image processing apparatus comprising a compressing section to compress image data, an enlarging section to electrically enlarge the image data, and a control section to control the compressing section in accordance with a magnification of the enlarging section is provided.

17 Claims, 14 Drawing Sheets

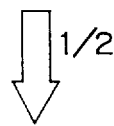

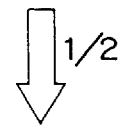

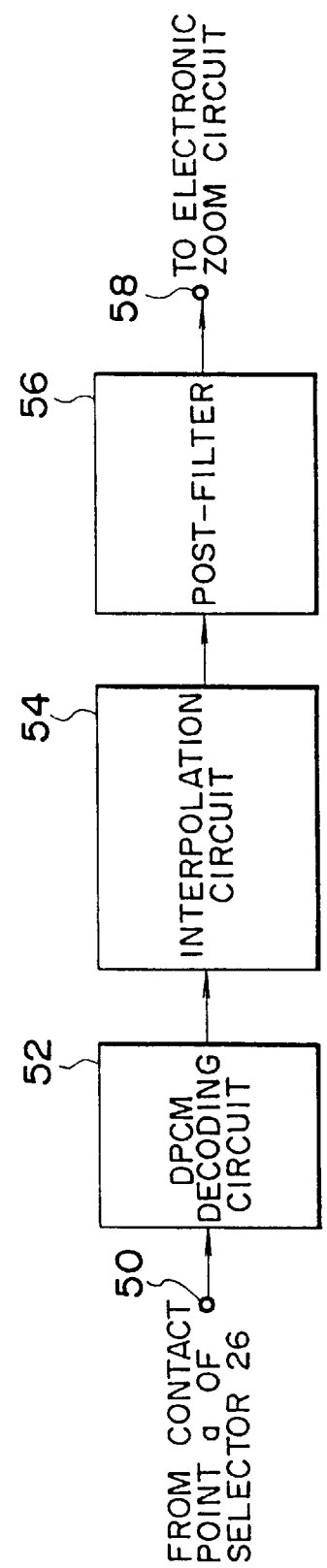

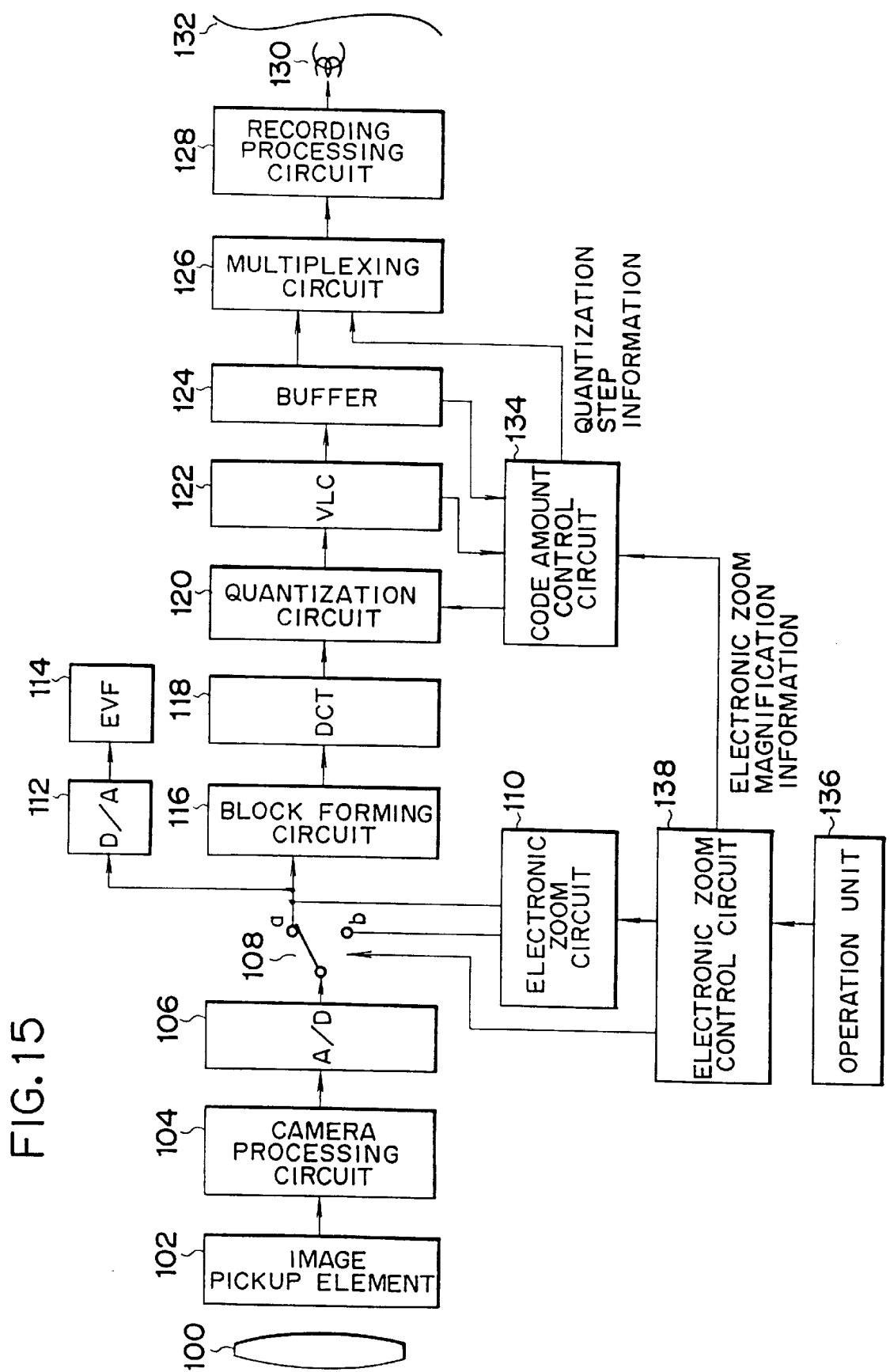

IMAGE PROCESSING APPARATUS FOR COMPRESSING IMAGE DATA ACCORDING TO AN ENLARGEMENT RATIO OF AN ENLARGED IMAGE DATA

This is a continuation of application Ser. No. 08/113,437, filed on Aug. 27, 1993, now abandoned.

BACKGROUND OF THE INVENTION

1. Field of the Invention

The present invention relates to an image processing apparatus and, more particularly, to an image processing apparatus having a processing function to electrically enlarge an image.

2. Related Background Art

An image pickup apparatus having image pickup means for converting an optical image into an electric signal, for example, a video camera, an electronic still video camera, a television camera, or the like has a function to perform video effects such as snapping, hand vibration correction, electronic zoom, and the like by providing an image memory to temporarily store a photographed image.

The image memory to temporarily store the photographed image generally needs a memory capacity of at least one image plane (field or frame). For example, now assuming that each of the luminance signal and the color difference signal of one field is stored by eight bits, a memory capacity of 3 Mbits is needed in this instance, so that the size and costs of the image memory increase.

Therefore, there has been proposed a construction such that a compression encoding circuit is provided on the input side of an image memory and an expansion decoding circuit is provided on the output side, of the image memory thereby decreasing the memory capacity of the image memory.

In case of assembling an electronic zoom function into a circuit construction to perform the compressing and expanding processes at the stages before and after the storage into the image memory as mentioned above, the following troubles occur.

First, the electronic zoom is a process such that a part of an image is cut out and, in order to enlarge the cut-out portion to a standard angle of view, the pixel values which lack are interpolated by the adjacent pixel values, thereby electrically enlarging the image.

Therefore, as a magnification of the electronic zoom is large, a deterioration of the image (picture quality) increases by the above interpolating process.

Although a compressing process is executed in order to temporarily store the image signal into the image memory, the picture quality is fairly deteriorated by the compressing process.

Consequently, in case of performing the electronic zoom in the conventional image processing apparatus, the image is deteriorated by the compressing and expanding processes which are executed to temporarily store the image data into the image memory and the electronic zooming process is performed to such a deteriorated image, so that the image is further deteriorated.

Such a problem as mentioned above also similarly occurs in an image processing apparatus such as a digital VTR for converting an analog image signal into a digital image signal and recording onto a recording medium.

In the digital VTR, when a digital image signal is recorded onto the recording medium, the image signal is compressed.

Therefore, when the image which was subjected to the electronic zooming process mentioned above is recorded, the image which was deteriorated by the electronic zoom by the compressing process is further deteriorated.

SUMMARY OF THE INVENTION

Under such circumstances, it is an object of the invention to solve the above problems and to provide an image processing apparatus which can prevent an image deterioration when an image is electrically enlarged.

To accomplish the above object, according to one preferred embodiment, there is provided an image processing apparatus comprising: compressing means for compressing image data; enlarging means for electrically enlarging the image data; and control means for controlling a compression ratio of the compressing means in accordance with an enlargement ratio of the enlarging means.

The above and other objects, features, and advantages of the invention will become apparent from the following detailed description taken in conjunction with the appended claims.

BRIEF DESCRIPTION OF THE DRAWINGS

FIG. 4 is a diagram showing an internal circuit of an expansion circuit 24 in FIG. 1;

FIG. 15 is a block diagram of a camera integrated type digital VTR according to the third embodiment of the invention.

DETAILED DESCRIPTION OF THE PREFERRED EMBODIMENTS

A video camera of the first embodiment according to the invention will be described as an example hereinbelow.

Figure 1:
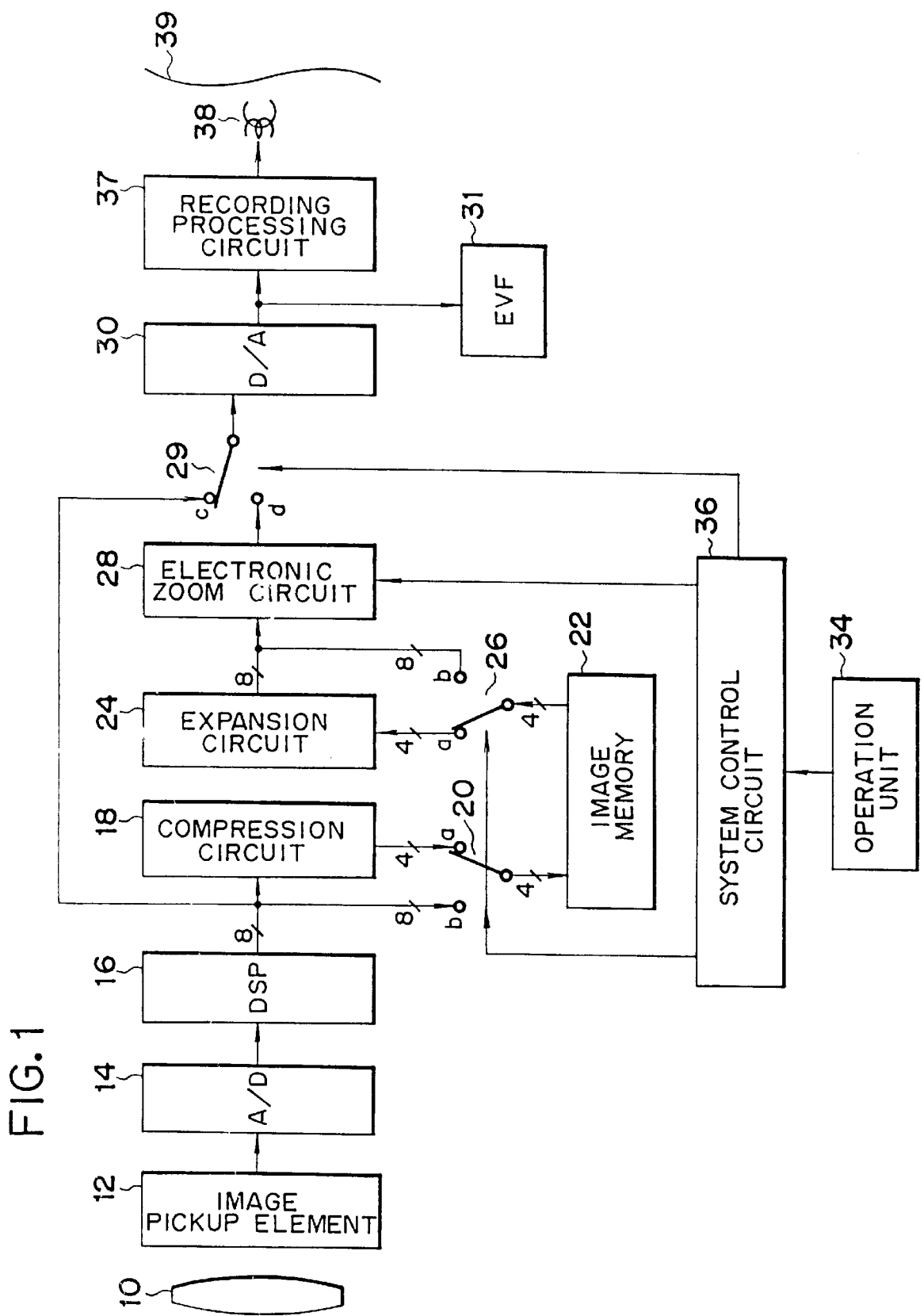
FIG. 1 is a block diagram of a camera integrated type VTR according to the first embodiment of the invention.

FIG. 1 is a constructional block diagram of a camera integrated type VTR of the first embodiment according to the invention.

In FIG. 1, reference numeral 10 denotes a photographing lens; 12 an image pickup element to convert an optical image into an electric signal; 14 an A/D converter to convert an analog image signal from the image pickup element 12 into a digital image signal; and 16 a digital signal processing circuit (DSP). The DSP 16 executes well-known camera signal processes such as gamma correction, color balance adjustment, and the like and generates image signals in forms of a luminance signal of eight bits and 8-bit color difference signals. Explanation will now be made hereinbelow with respect to the luminance signal to make the description easy.

Reference numeral 18 denotes a compression circuit to compress output data of the DSP 16 into ¼ and 20 indicates a selector to select the output of the DSP 16 or an output of the compression circuit 18.

Reference numeral 22 denotes an image memory which can store the image data of one image plane compressed by the compression circuit 18. In case of compressing the image data of one standard image plane into ¼, the image data of one image plane can be stored into the image memory 22 of the embodiment.

Reference numeral 24 denotes an expansion circuit having an expansion ratio corresponding to a compression ratio of the compression circuit 18 and 26 indicates a selector to selectively supply an output of the image memory 22 to the expansion circuit 24 or an electronic zoom circuit 28.

Reference numeral 28 denotes the electronic zoom circuit to electrically enlarge a signal from the expansion circuit 24 or selector 26; 29 a change-over switch to select the output from the DSP 16 or the output from the electronic zoom circuit 28; 30 a D/A converter to convert the digital signal into the analog signal; 31 an electronic view finder (EVF) to electrically display the digital signal generated from the D/A converter 30; 34 an operation unit to input a command (for instance, an electronic zoom magnification or the like) of the electronic zoom function; and 36 a system control circuit to control the selectors 20 and 26, electronic zoom circuit 28 (for example, a zoom magnification), and change-over switch 29 in accordance with a command from the operation unit 34.

Reference numeral 37 denotes a recording processing circuit for executing a predetermined process (for instance, modulation or the like) to record the image data onto a magnetic tape 39; 38 a magnetic head; 39 a magnetic tape.

Figure 5:
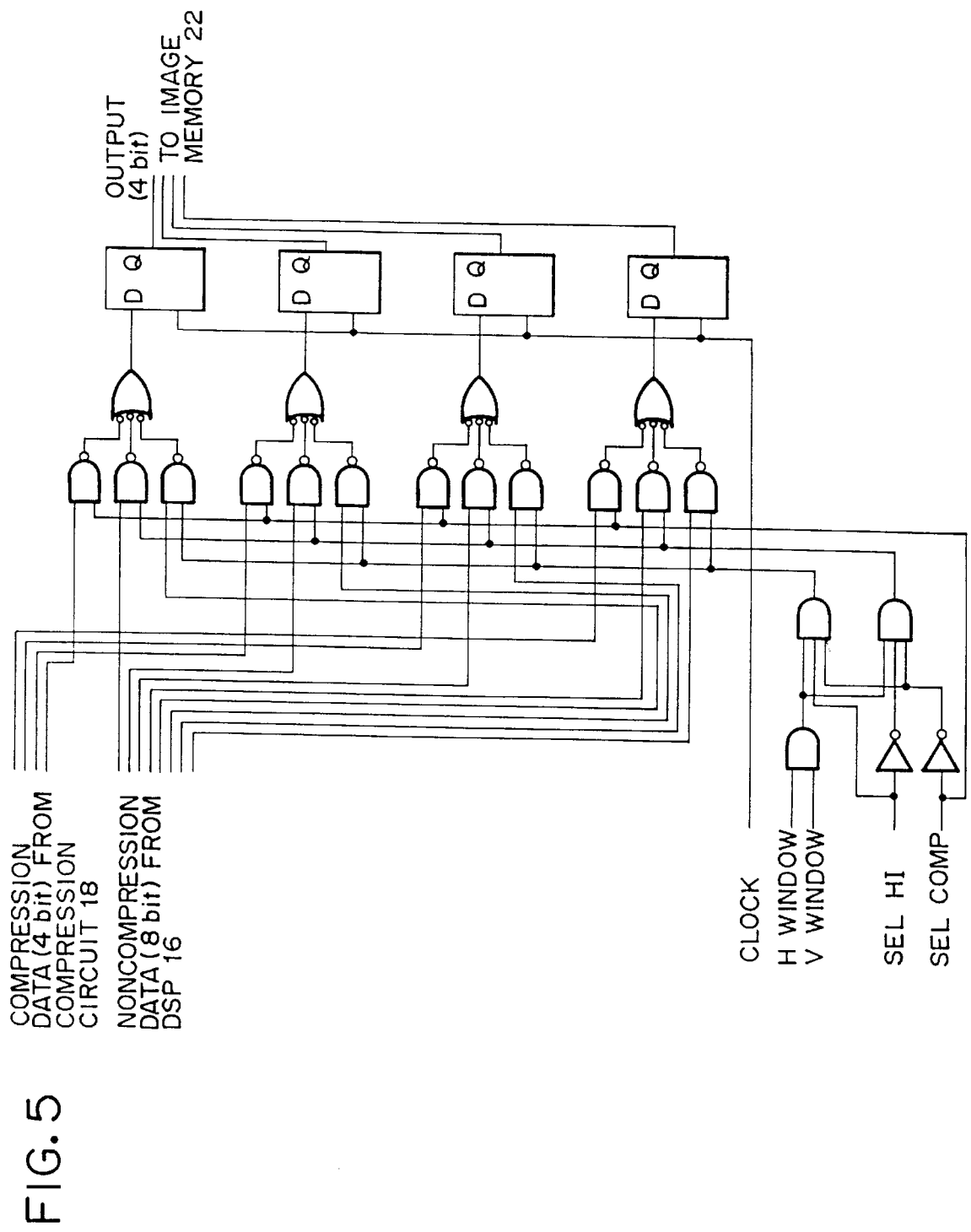
FIG. 5 is an internal circuit diagram of a selector 20.
Figure 6:
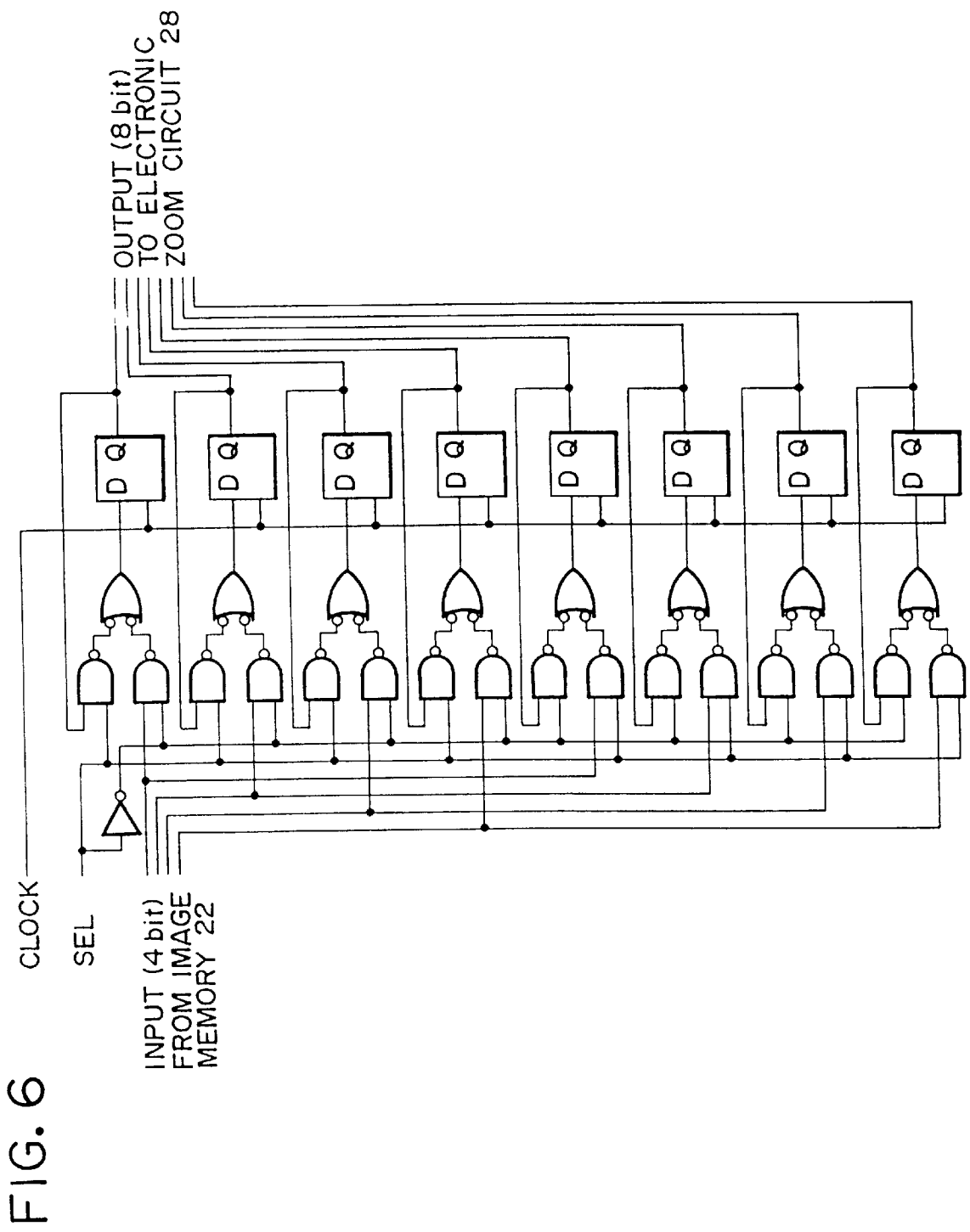
FIG. 6 is an internal circuit diagram of a selector 26.

FIG. 5 shows an internal circuit of the selector 20. FIG. 6 shows an internal circuit of the selector 26. FIG. 6 shows a circuit portion for directly supplying the 4-bit data from the image memory 22 to the electronic zoom circuit 28 without expanding the 4-bit data. There is a circuit (not shown) to supply the 4-bit data from the image memory 22 to the expansion circuit 24.

The selector 20 has a converting function to divide the 8-bit data which is generated from the DSP 16 into two 4-bit data of upper four bits and lower four bits. The selector 20 also has a gating function for allowing the image data in arbitrary horizontal and vertical regions in the image plane to pass by a horizontal window signal (H_WINDOW) and a vertical window signal (V_WINDOW).

On the other hand, the selector 26 contrarily has a converting function for combining the above two 4-bit data to the 8-bit data (allocates to the upper four bits and the lower four bits) as will be explained in detail hereinbelow.

Figure 2:
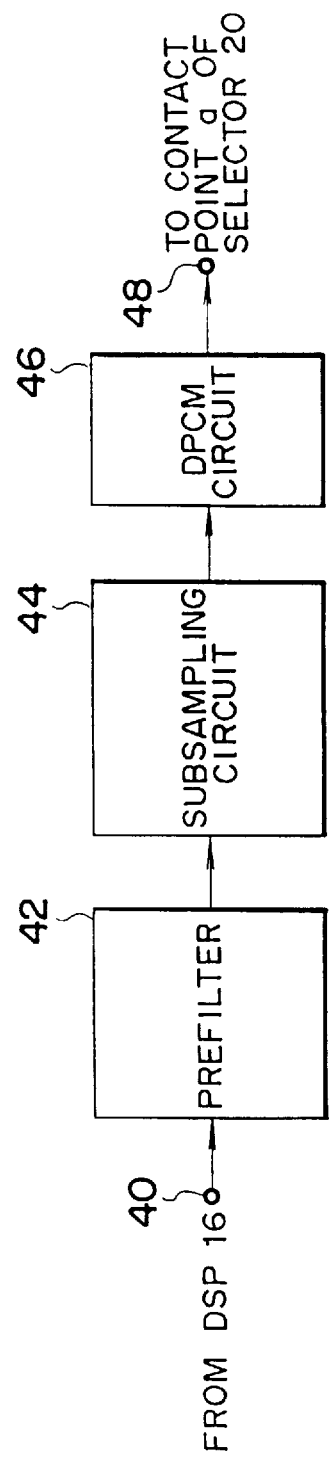
FIG. 2 is an internal circuit diagram of a compression circuit 18 in FIG. 1.

FIG. 2 shows an internal block diagram of the compression circuit 18.

In FIG. 2, the 8-bit data supplied from the DSP 16 is sent to an input terminal 40.

A prefilter 42 eliminates the slant component of the luminance data transmitted from the input terminal 40 as a pre-process of the subsampling. A subsampling circuit 44 thins out an output of the prefilter 42 into ½ in the horizontal direction. Further, an output of the subsampling circuit 44 is compressed into ½ by a DPCM circuit 46. Namely, the compression circuit 18 compresses the input image data into ¼ and generates the compressed data.

Figure 3A:
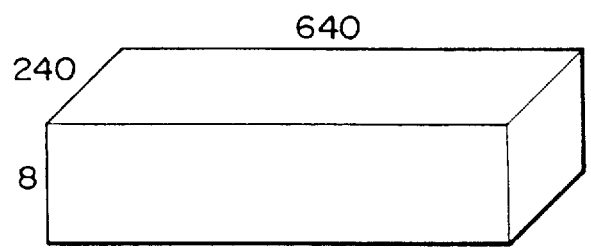
FIGS. 3A to 3C are diagrams for explaining the compression processing operation of the compression circuit 18.

A state of compression will now be practically explained with respect to the case of the luminance signal. As shown in FIG. 3A, it is assumed that the luminance data of the original image is constructed by 640 pixels in the horizontal direction, 240 lines, and eight bits and is a field image of about 1.23 Mbits.

Figure 3B:
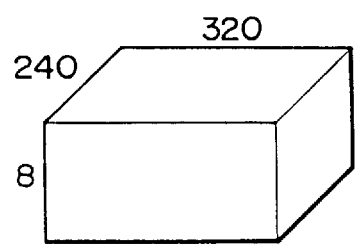

By subsampling the luminance data by the subsampling circuit 44, as shown in FIG. 3B, the number of pixels in the horizontal direction is reduced to ½ and is set to 320 and the data is set to about 0.61 Mbits per field.

Figure 3C:
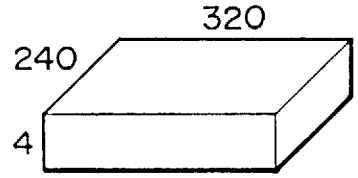

By further compressing the luminance data into four bits from eight bits by the DPCM circuit 46, as shown in FIG. 3C, the data is compressed into ½ in the depth direction and is set to about 0.3 Mbits.

FIG. 4 shows an internal block diagram of the expansion circuit 24.

In FIG. 4, the 4-bit data from a contact point (a) of the selector 26 is supplied to an input terminal 50.

A DPCM decoding circuit 52 DPCM decodes the 4-bit data from the input terminal 50 and generates the 8-bit data.

An interpolation circuit 54 interpolates the pixels which were thinned out by the subsampling circuit 44 by, for example, inserting a zero value or an average value of the values of the pixels which are located on both sides or near positions.

An output of the interpolation circuit 54 is smoothed by a post-filter 56 and is supplied from an output terminal 58 to the electronic zoom circuit 28.

Namely, in the expansion circuit 24, the DPCM decoding circuit 52 expands the data from four bits to eight bits in the depth direction and the interpolation circuit 54 doubles the number of pixels in the horizontal direction. Consequently, the image data which is generated from the output terminal 58 is set to 640×240×8 bits.

Although not shown, two systems of the circuits as shown in FIGS. 2 and 4 are provided for the luminance signal and for the color difference signals in the compression circuit 18 and expansion circuit 24.

In the embodiment, since the compression factor of the compression circuit 18 is set to ¼, when a zoom magnification of the electronic zoom circuit 28 is equal to or larger than four times, the effect which is peculiar to the embodiment can be obtained.

The image processing operation when executing the electronic zoom function in the first embodiment will now be described hereinbelow.

In the embodiment, in the ordinary photographing mode, the change-over switch 29 is connected to the (c) side and no image signal is stored into the image memory 22. When a command to execute the electronic zoom function is inputted from the operation unit 34, the switch 29 is connected to the (d) side and the image signal is stored into the memory 22.

The operation in the case where the command to execute the electronic zoom function is inputted from the operation unit 34 and the electronic zoom magnification is less than four times will now be described.

The system control circuit 36 connects each of the selectors 20 and 26 to the (a) contact point.

The image pickup element 12 converts the optical image obtained by the photographing lens 10 into the electric signal. The A/D converter 14 converts the output of the image pickup element 12 into the digital signal.

The output data of the A/D converter 14 is processed by the DSP 16 and is sent to the compression circuit 18 after that.

The compression circuit 18 compresses the 8-bit image data into ¼ as mentioned above.

The output of the compression circuit 18 is the 4-bit data and is temporarily stored into the image memory 22 as it is through the selector 20.

The compressed image data stored in the memory 22 is read out and transmitted to the expansion circuit 24 through the selector 26.

The expansion circuit 24 expands the supplied compressed image data as mentioned above and sends to the electronic zoom circuit 28.

The electronic zoom circuit 28 electrically magnifies the input image by a magnification designated by the system control circuit 36. For example, in case of the zoom of two times (refer to FIG. 7), the image data of (453 pixels in the horizontal direction)×(170 lines in the vertical direction) of the central portion of the input image is extracted and is subjected to the interpolating process and is generated as an image of (640 pixels)×(240 lines).

The digital image data generated from the electronic zoom circuit 28 is converted into the analog image data by the D/A converter 30 and is subjected to a predetermined process (for example, modulating process or the like) by the recording processing circuit 37 and is recorded onto the magnetic tape 39 by the magnetic head 38. The photographed image (image which was electronically zoomed) can be also displayed by the EVF 31.

The operation in the case where the command to execute the electronic zoom function is inputted from the operation unit 34 and the electronic zoom magnification is set to four times will now be described hereinbelow.

When the electronic zoom magnification is equal to four times (refer to FIG. 8), only the image data of (320 pixels in the horizontal direction)×(120 lines) of the central portion of the standard photographed image data (640 pixels×240 lines) is extracted and stored into the image memory 22. That is, in case of storing only the extracted image data (320 pixels×120 lines), an amount of extracted image data is equal to ¼ of the amount of standard image data (640 pixels×240 lines). As a data amount, consequently, this means that the whole standard image data is compressed into ¼ by the compression circuit 18. In the embodiment, therefore, when the electronic zoom magnification is equal to or larger than four times, only the data of necessary central portion of the photographed image which is electronically zoomed is not compressed but stored into the image memory 22.

First, the system control circuit 36 connects each of the selectors 20 and 26 to the (b) side.

The image data from the image pickup element 12 is processed by the A/D converter 14 and DSP 16 and supplied to the (b) side of the selector 20.

Figure 9:
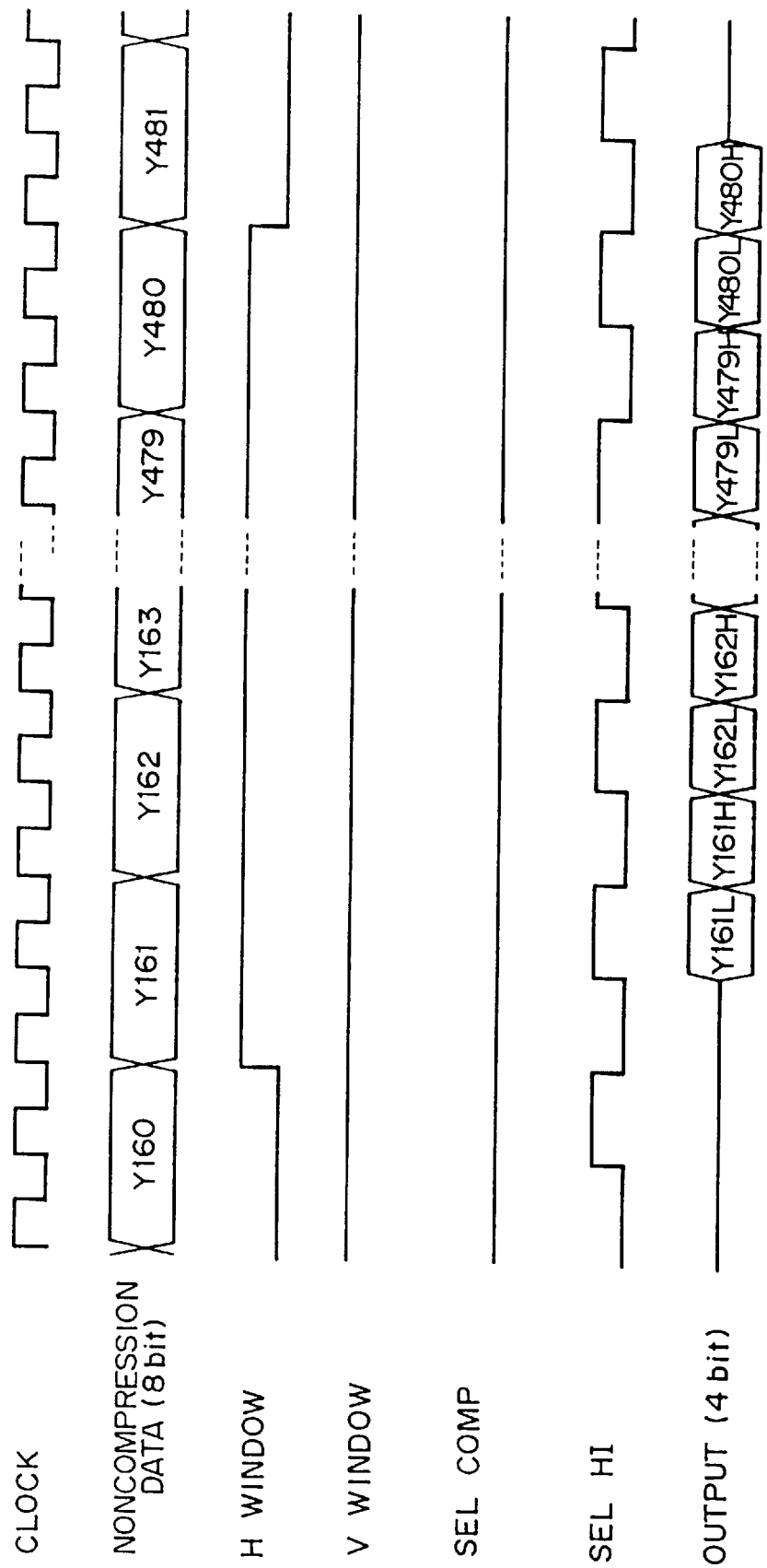
FIG. 9 is a timing chart of the selector 20 in case of the electronic zoom of four times.

FIG. 9 shows an operation timing chart of the selector 20. In the 8-bit output (non-compressed data) of the DSP 16, the image data included in the 161st to 480th pixels of the horizontal line and the image data included in the 61st to 180th lines are selected by the H_WINDOW signal and V_WINDOW signal.

The selected 8-bit data is divided into the two 4-bit data of lower four bits and upper four bits by an SET_HI signal and supplied to latch circuits of four stages and is sequentially supplied to the image memory 22 as 4-bit data in accordance with the order of lower four bits and upper four bits.

As mentioned above, the image data of the central portion which is necessary when the electronic zoom magnification is equal to four times is stored into the image memory 22 in a non-compressed state.

The non-compressed image data stored in the memory 22 is read out and sent to the selector 26.

Figure 10:
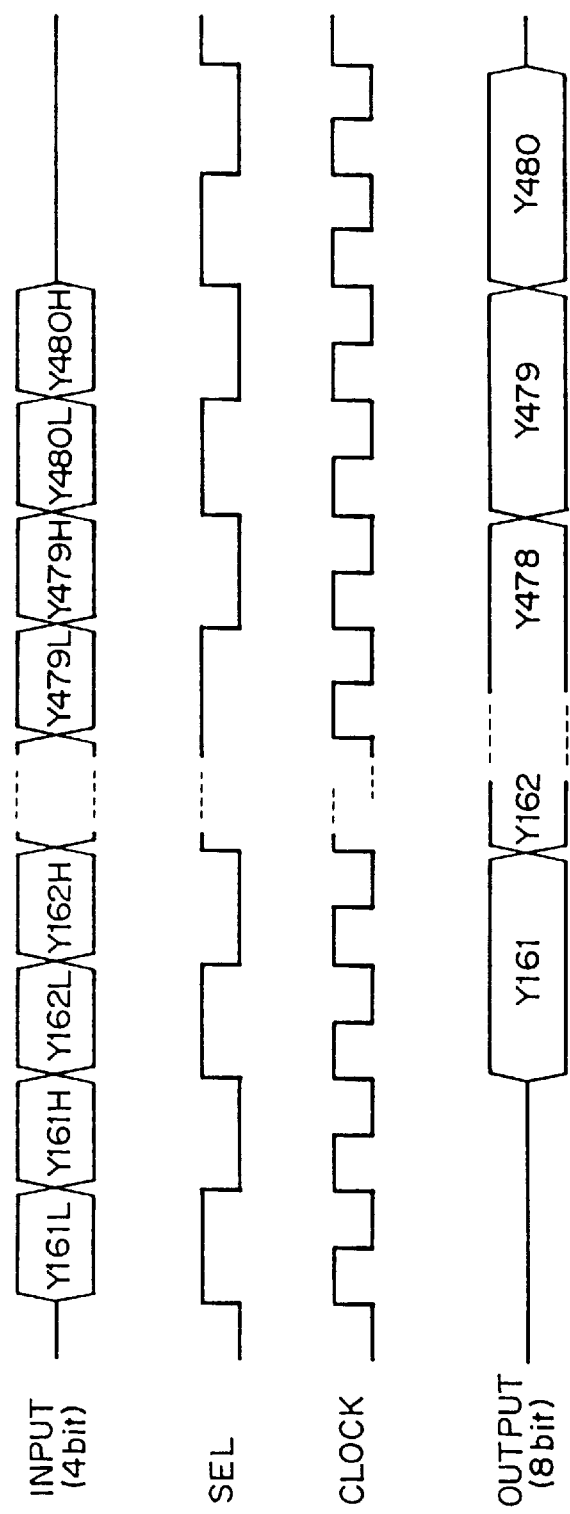
FIG. 10 is a timing chart of the selector 26 in case of the electronic zoom of four times.

FIG. 10 shows an operation timing of the selector 26.

The 4-bit data is fetched to the upper four bits and lower four bits of latch circuits of eight stages by an SEL signal and is converted into the 8-bit data. When eight bits are collected, the 8-bit data is supplied to the electronic zoom circuit 28.

The image data of the central portion (320 pixels×120 lines) of the ordinary image data is supplied to the electronic zoom circuit 28.

The image data sent to the electronic zoom circuit 28 is interpolated, so that the ordinary image data of (640 pixels)×(240 lines) is generated. The digital image signal generated from the electronic zoom circuit 28 is converted into the analog image signal by the D/A converter 30. The analog image signal is subjected to a predetermined process (for example, modulating process or the like) by the recording processing circuit 37 and is recorded onto the magnetic tape 39 by the magnetic head 38. The photographed image can be displayed by the EVF 31.

As will be easily understood from the above description, according to the first embodiment, in case of electronically zooming the photographed image data at a predetermined magnification or more, the compressing process is not executed, so that the deterioration in picture quality can be reduced.

A camera integrated type VTR of the second embodiment will now be described.

Figure 11:
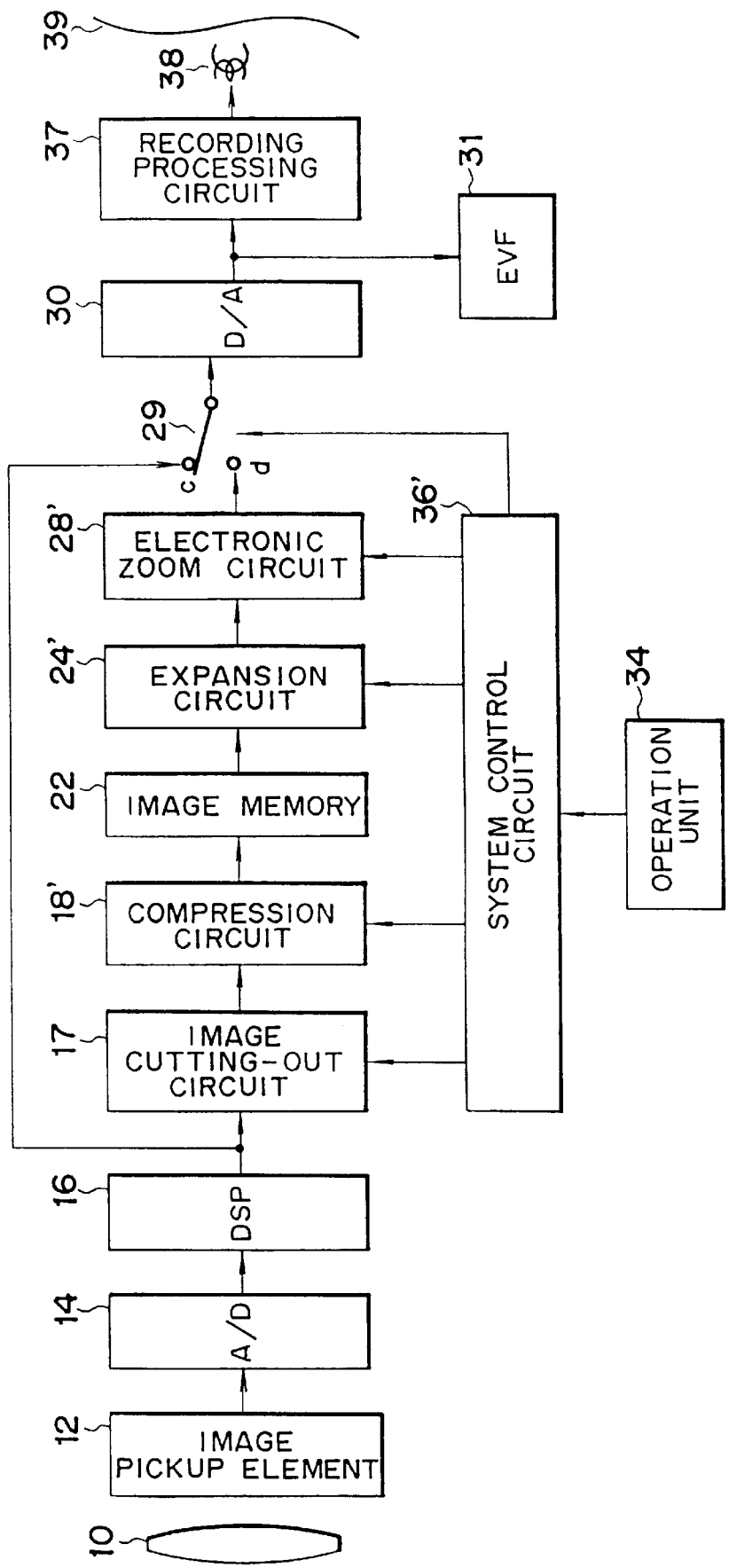
FIG. 11 is a block diagram of a camera integrated type VTR according to the second embodiment of the invention.

FIG. 11 is a constructional block diagram of a video camera of the second embodiment according to the invention. In FIG. 11, the portions corresponding to those in FIG. 1 are designated by the same reference numerals and their descriptions are omitted here.

Reference numeral 17 denotes an image extracting circuit to extract only the necessary image data in the image data supplied from the DSP 16 in accordance with the electronic zoom magnification which is inputted from the operation unit 34.

Figure 12:
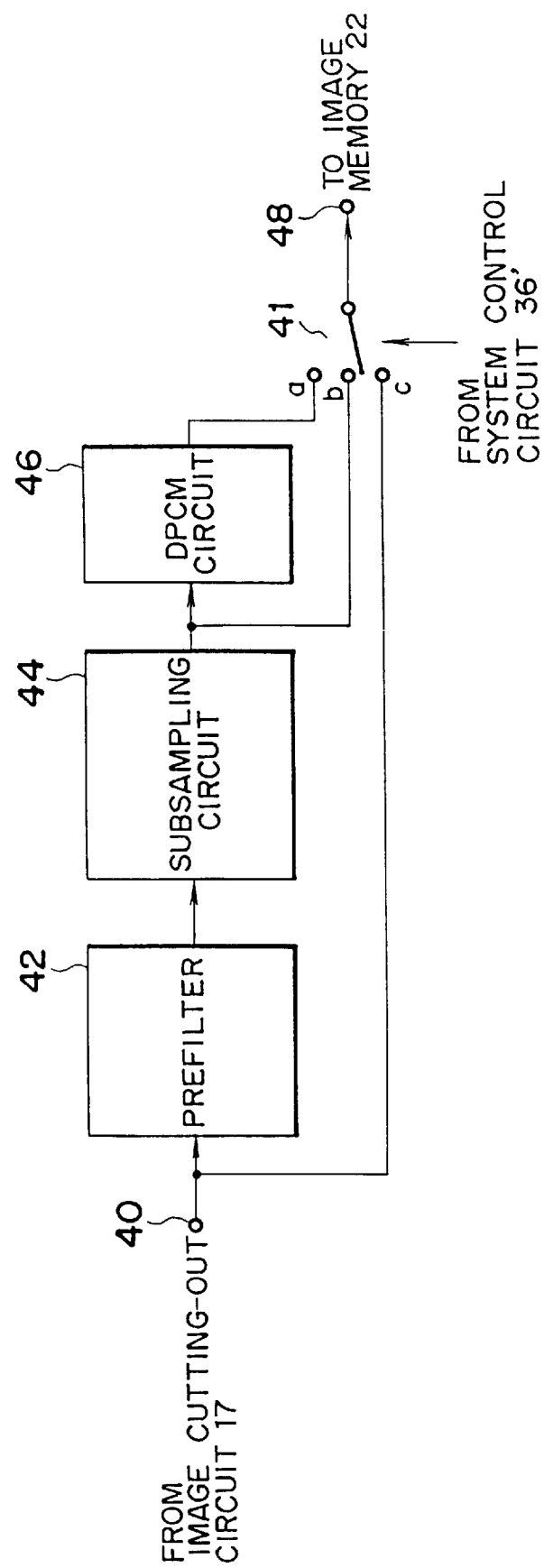
FIG. 12 is an internal circuit diagram of a compression circuit 18' in FIG. 11.

An internal circuit construction of a compression circuit 18' in FIG. 11 will now be described with reference to FIG. 12. In FIG. 12, the portions corresponding to those in FIG. 2 are designated by the same reference numerals and their descriptions are omitted. In the second embodiment, by providing a change-over switch 41, the compression factor can be varied to ½ or ¼. The switch 41 is controlled by a system control circuit 36'.

In the case where the compressing process is not executed, the switch 41 is connected to the (c) side, so that the non-compressed image data is transmitted into the image memory 22.

In case of setting the compression ratio into ½, the switch 41 is connected to the (b) side. An amount of image data is compressed into ½ by the prefilter 42 and subsampling circuit 44. The compressed image data is supplied to the memory 22.

In case of setting the compression ratio into ¼, the switch 41 is connected to the (a) side. An amount of image data is compressed into ¼ by the prefilter 42, subsampling circuit 44, and DPCM circuit 46. The compressed image data is supplied to the memory 22.

Figure 13:
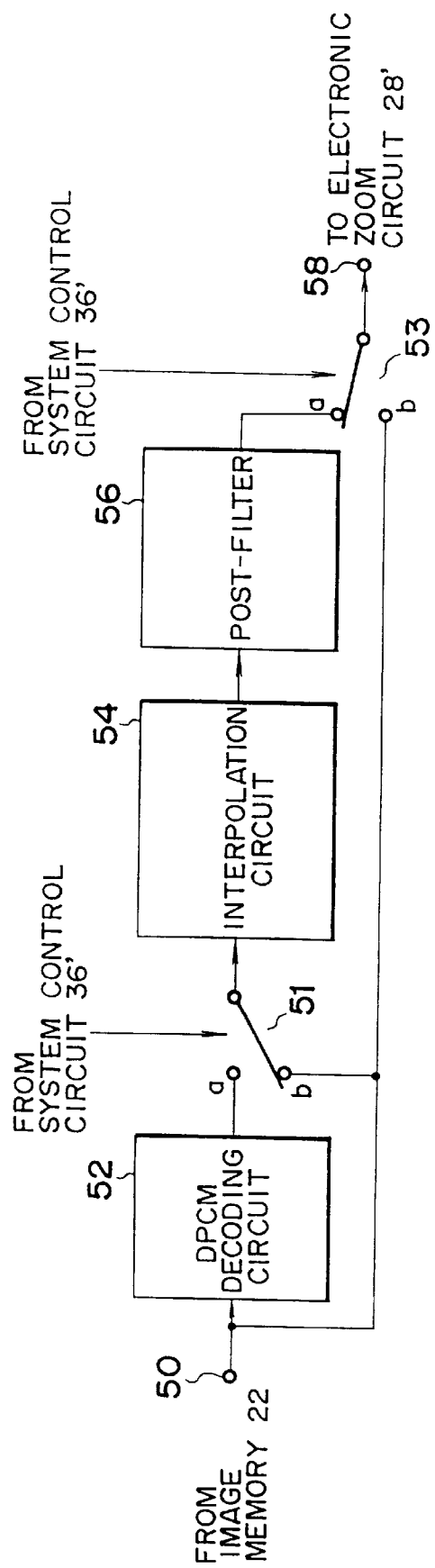
FIG. 13 is an internal circuit diagram of an expansion circuit 24' in FIG. 11.

An internal circuit construction of an expansion circuit 24' in FIG. 11 will now be described with reference to FIG. 13. In FIG. 13, the portions corresponding to those in FIG. 3 are designated by the same reference numerals and their descriptions are omitted. In the second embodiment, by providing change-over switches 51 and 53, the expansion ratio can be changed in correspondence to the compression ratio of the compression circuit 18'. In the embodiment, the image data can be expanded by two or four times.

When the image data supplied to the input terminal 50 is not compressed, the switch 53 is connected to the (b) side. The image data supplied to the input terminal 50 is directly generated from the output terminal 58 and transmitted to an electronic zoom circuit 28'. When the image data sent to the input terminal 50 has been compressed into ½, the switch 51 is connected to the (b) side and the switch 53 is connected to the (a) side. The supplied image data is expanded two times by the interpolation circuit 54 and post-filter 56 and transmitted to the electronic zoom circuit 28'.

In the case where the image data sent to the input terminal 50 has been compressed into ¼, each of the switches 51 and 53 is connected to the (a) side. The supplied image data is expanded four times by the DPCM decoding circuit 52, interpolation circuit 54, and post-filter 56 and transmitted to the electronic zoom circuit 28'.

The image processing operation when executing the electronic zoom function in the second embodiment will now be described hereinbelow.

In the embodiment, in the ordinary photographing mode (the electronic zoom function is not executed), the change-over switch 29 is connected to the (c) side and no image signal is stored into the memory 22. When a command to execute the electronic zoom function is inputted from the operation unit 34, the switch 29 is connected to the (d) side. The image signal is stored into the memory 22 and is electronically zoomed.

The operation in the case where the command to execute the electronic zoom function is inputted from the operation unit 34 and the electronic zoom magnification is set to a value less than two times will be first described. The case where the electronic zoom magnification is equal to 1.5 times will now be described.

The image pickup element 12 converts the optical image obtained by the photographing lens 10 into the electric signal. The A/D converter 14 converts the output of the image pickup device 12 into the digital signal.

The output of the A/D converter 14 is processed by the DSP 16 and is subsequently supplied to the image cutting-out circuit 17.

Figure 14:
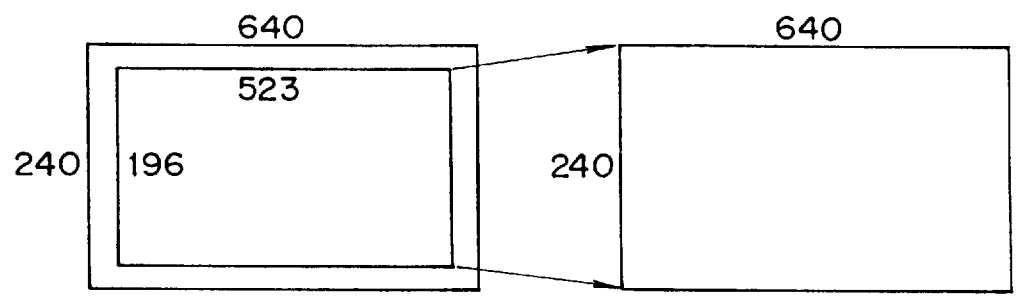
FIG. 14 is a schematic explanatory diagram when an electronic zoom magnification is set to 1.5 times.

As shown in FIG. 14, the image cutting-out circuit 17 extracts the image data of (523 pixels in the horizontal direction)×(196 lines in the vertical direction) which is necessary for the electronic zoom process from the central portion of the image data (640 pixels in the horizontal direction)×(240 lines in the vertical direction) photographed. The extracted image data is supplied to the compression circuit 18'.

The compression circuit 18' compresses the supplied image data into ¼ as mentioned above.

The compressed image data is temporarily stored into the memory 22.

The compressed image data stored in the image memory 22 is read out and sent to the expansion circuit 24'.

The expansion circuit 24' expands the supplied compressed image data in accordance with the compression ratio as mentioned above and transmits to the electronic zoom circuit 28'.

The electronic zoom circuit 28' electrically enlarges the input image into the image of the size of the standard image (refer to FIG. 14).

The enlarged digital image data is converted into the analog signal by the D/A converter 30 and is subjected to a predetermined process (for example, modulating process or the like) by the recording processing circuit 37. The processed signal is recorded onto the magnetic tape 39 by the recording head 38. The image which was electrically enlarged can be also confirmed by the EVF 31.

The operation in the case where the command to execute the electronic zoom function is inputted from the operation unit 34 and the electronic zoom magnification is equal to or larger than two times and is less than four times will now be described. The case where the zoom magnification is equal to two times will now be described as an example.

The image pickup element 12 converts the optical image obtained by the photographing lens 10 into the electric signal. The A/D converter 14 converts the output of the image pickup element 12 into the digital signal.

The output of the A/D converter 14 is processed by the DSP 16 and is subsequently sent to the image cutting-out circuit 17.

Figure 7:
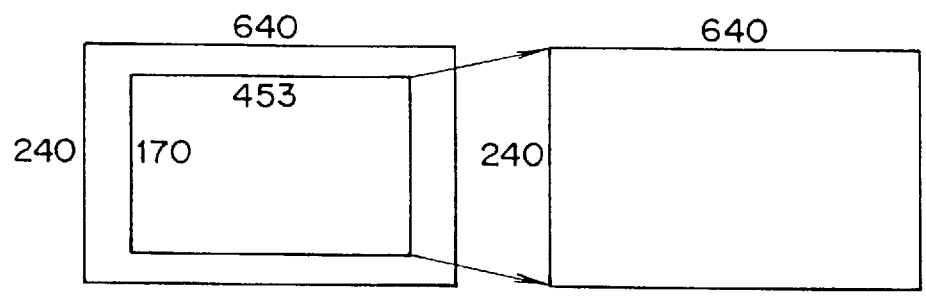
FIG. 7 is a schematic explanatory diagram when an electronic zoom magnification is set to two times.

As shown in FIG. 7, the image cutting-out circuit 17 extracts the image data of (453 pixels in the horizontal direction)×(170 lines in the vertical direction) which is necessary for the electronic zoom process from the central portion of the standard image data of (640 pixels in the horizontal direction)×(240 lines in the vertical direction) photographed. The extracted image data is transmitted to the compression circuit 18'.

The compression circuit 18' compresses the supplied image data into ½ as mentioned above.

The compressed image data is temporarily stored into the image memory 22.

The compressed image data stored in the image memory 22 is read out and transmitted to the expansion circuit 24'.

The expansion circuit 24' expands the supplied compressed image data two times in correspondence to the compression ratio as mentioned above. The expanded image data is sent to the electronic zoom circuit 28'.

The electronic zoom circuit 28' electrically enlarges the input image to the image of the size of the standard image (refer to FIG. 7).

The enlarged digital image data is converted into the analog signal by the D/A converter 30. The analog signal is subjected to a predetermined process (for example, modulating process or the like) by the recording processing circuit 37. The processed signal is recorded onto the magnetic tape 39 by the magnetic head 38. The image which was electrically enlarged can be also confirmed by the EVF 31.

The operation in the case where the command to execute the electronic zoom function is inputted from the operation unit 34 and the electronic zoom magnification is set to four times or more will now be described. The case where the zoom magnification is equal to four times will now be explained as an example.

The image pickup element 12 converts the optical image obtained by the photographing lens 10 into the electric signal. The A/D converter 14 converts the output of the image pickup device 12 into the digital signal.

The output of the A/D converter 14 is processed by the DSP 16 and is subsequently supplied to the image cutting-out circuit 17.

Figure 8:
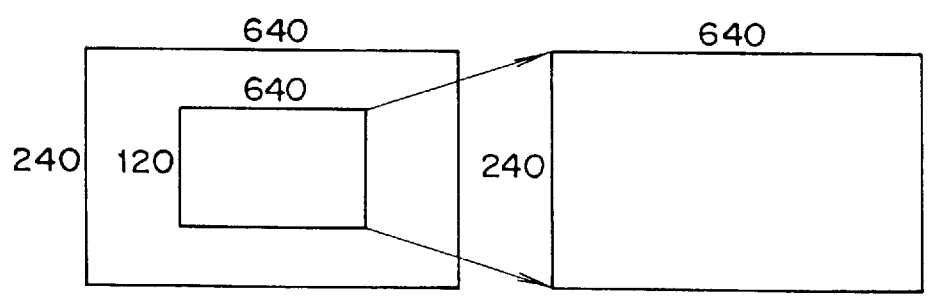
FIG. 8 is a schematic explanatory diagram when an electronic zoom magnification is set to four times.

The image cutting-out circuit 17 extracts the image data of (320 pixels in the horizontal direction)×(120 lines in the vertical direction) which is necessary for the electronic zoom process from the central portion of the standard image data (640 pixels in the horizontal direction)×(240 lines in the vertical direction) photographed as shown in FIG. 8. The extracted image data is sent to the compression circuit 18'.

The compression circuit 18' transmits the input image data into the image memory 22 without compressing it. The memory 22 temporarily stores the non-compressed image data.

The image data stored in the memory 22 is read out and sent to the expansion circuit 24'.

The expansion circuit 24' supplies the input image data to the electronic zoom circuit 28' without expanding it.

The electronic zoom circuit 28' electrically enlarges the input image to the image of the size of the standard image (refer to FIG. 8).

The enlarged digital image data is converted into the analog signal by the D/A converter 30 and is subjected a predetermined process (for example, modulating process or the like) by the recording processing circuit 37. The processed signal is recorded onto the magnetic tape 39 by the magnetic head 38. The image which was electrically enlarged can be also confirmed by the EVF 31.

As will be easily understood from the above explanation, according to the second embodiment, the compression ratio of the compression circuit 18' and the expansion ratio of the expansion circuit 24' can be varied and the compression ratio and expansion ratio are controlled in accordance with the electronic zoom magnification. Therefore, the deterioration in the picture quality can be further reduced as compared with the first embodiment.

A camera integrated type digital VTR according to the third embodiment will now be described.

FIG. 15 is a block diagram of the camera integrated type digital VTR of the third embodiment.

In FIG. 15, reference numeral 100 denotes a photographing lens; 102 an image pickup element; 104 a camera processing circuit to execute a predetermined camera process to an image signal derived from the image pickup element 102; 106 an A/D converter; 108 a change-over switch; 110 an electronic zoom circuit; 112 a D/A converter; 114 an electronic view finder (EVF); 116 a block forming circuit; 118 a DCT (Discrete Cosine Transform) circuit; 120 a quantization circuit; 122 a variable length encoding circuit (VLC); 124 a buffer memory; 126 a multiplexing circuit; 128 a recording processing circuit; 130 a magnetic head; 132 a magnetic tape; 134 a code amount control circuit; 136 an operation unit to instruct the execution of the electronic zoom function; and 138 a system control circuit to control the change-over switch 108, electronic zoom circuit 110, and code amount control circuit 134 in accordance with the operation of the operation unit 136.

The electronic zoom circuit 110 comprises the compression circuit 18, selectors 20 and 26, image memory 22, expansion circuit 24, and electronic zoom circuit 28 which have already been described in the first embodiment. Or, the electronic zoom circuit 110 comprises the image cutting-out circuit 17, compression circuit 18', image memory 22, expansion circuit 24', and electronic zoom circuit 28' which have already been described in the second embodiment. The enlarging process is also similar to that described in the first or second embodiment.

The recording processing operation in the ordinary photographing mode (the electronic zoom is not used) will be first described.

The image pickup element 12 converts the optical image derived by the photographing lens 10 into the electric signal and is subjected to a predetermined signal process by the camera processing circuit 104.

Image data generated from the camera processing circuit 104 is converted into the digital signal by the A/D converter 106.

The digital signal is supplied to the block forming circuit 116 and the D/A converter 112 through the switch 108 (which is connected to the (a) side).

The D/A converter 112 converts the digital signal into the analog signal. The photographed image can be displayed by the EVF 114.

On the other hand, the block forming circuit 116 divides the digital signal into a plurality of blocks each comprising (8×8) pixels.

The divided block data is subjected to an orthogonal transformation by the DCT circuit 118 and is converted into frequency components.

The frequency coefficient data generated from the DCT circuit 118 is sent to the quantization circuit 120.

In the quantization circuit 120, a set of data coefficients of every frequency component is divided by a numerical value which is controlled as will be explained hereinlater, figures below decimal point are omitted, the number of bits is reduced, and a whole quantization data amount is compressed.

The quantization data is sent to the VLC 122.

In order to convert the quantization data into the one-dimensional data train, the data is scanned from the low frequency components in the horizontal and vertical directions to the high frequency components in a zigzag manner. The data is rearranged and variable length encoding is executed to the rearranged data.

The variable length encoded data is supplied to the code amount control circuit 134 and buffer memory 124.

The code amount control circuit 134 calculates an amount of encoded data and controls the quantization coefficients of the quantization circuit 120 in a manner such that an amount of encoded data is set to a predetermined data amount in accordance with the result of the calculation.

The encoded data is supplied from the buffer memory 124 to the multiplexing circuit 126 at a predetermined data rate.

An accumulation amount of data stored in the buffer memory 124 is supplied to the control circuit 134. The quantization coefficients of the quantization circuit 120 are controlled so as not to cause an underflow or overflow in the buffer memory 124.

On the other hand, quantization step information is generated from the code amount control circuit 134 to the multiplexing circuit 126. The multiplexing circuit 126 multiplexes the encoded data and the quantization step information and executes a formating process for recording. An output signal of the multiplexing circuit 126 is subjected to a predetermined recording process (for example, modulating process) by the recording processing circuit 128. The processed signal is recorded onto the magnetic tape 132 by the magnetic head 130.

The recording processing operation using the electronic zoom function will now be described hereinbelow.

Only the processing portions different from the forgoing recording processing operation when the electronic zoom function is not used will now be explained.

When the execution of the electronic zoom function is instructed by the operation unit 136, the switch 108 is connected to the (b) side by the electronic zoom control circuit 138.

The control circuit 138 controls the electronic zoom circuit 110 in accordance with the zoom magnification instructed from the operation unit 136.

For example, when a command to set the electronic zoom magnification to two times is generated from the operation unit 136, the electronic zoom circuit 110 extracts the image data (453 pixels in the horizontal direction)×(170 lines in the vertical direction) of the central portion from the standard image data (640 pixels in the horizontal direction)×(240 lines in the vertical direction) as shown in FIG. 7. The image data is enlarged to the image of the size of the standard image data by the interpolating process.

The electronic zoom magnification information is generated from the electronic zoom control circuit 138 to the code amount control circuit 134.

In accordance with the electronic zoom magnification information supplied, the code amount control circuit 134 executes a shift control in such a direction as to reduce the quantization coefficients of the quantization circuit 120 as compared with those in the ordinary photographing mode.

Namely, in the embodiment, by controlling the quantization step in accordance with the electronic zoom magnification, the compression ratio is reduced to a value smaller than that in the ordinary mode. The deterioration of the image which was electronically zoomed can be prevented. The digital image data can be recorded.

The present invention can be embodied by the other various forms without departing from the spirit and main features of the invention.

In other words, the foregoing description of the embodiments has been given for illustrative purpose only and not to be construed as imposing any limitation in every respect.

The scope of the invention is, therefore, to be determined solely by the following claims and not limited by the text of the specifications and alterations made within a scoe equivalent to the scope of the claims fallen within the true spirit and scope of the invention.

What is claimed is:

1. An image processing apparatus comprising:
a) inputting means for inputting image data;
b) compression encoding means for compression encoding the image data input by said inputting means;
c) memory means for storing the image data encoded by said compression encoding means;
d) enlarging means for electrically enlarging an image size of the image data stored in said memory means; and
e) control means for controlling an enlargement ratio of said enlarging means, said control means controlling a compression processing of said compression encoding means according to said enlargement ratio.

2. An apparatus according to claim 1, wherein said input means includes image pickup means for photographing an object image, thereby obtaining the image data.

3. An apparatus according to claim 2, further comprising recording means for recording the image data enlarged by said enlarging means on a recording medium.

4. An apparatus according to claim 1, further having display means for displaying the image enlarged by said enlarging means.

5. An apparatus according to claim 1, wherein said memory means extracts the image data the image data corresponding to a portion to be enlarged and stores the extracted partial image.

6. An image processing apparatus comprising:
a) input means for inputting image data;
b) enlarging means for electronically enlarging an image size of the image data input by said input means;
c) encoding means for encoding the image data enlarged by said enlarging means, said encoding means including quantizing means for quantizing the image data; and
d) control means for controlling an enlargement ratio of said enlarging means, said control means controlling a quantization step of said quantizing means according to said enlargement ratio.

7. An apparatus according to claim 6, wherein said encoding means includes converting means for converting the image data processed by said enlarging means into frequency component data and wherein said quantizing means quantizes the image data converted by said converting means.

8. An apparatus according to claim 6, further having multiplexing means for multiplexing the data encoded by said encoding means and quantization information regarding the quantization step which is controlled by said control means.

9. An apparatus according to claim 6, further having recording means for recording the data encoded by said encoding means onto a recording medium.

10. An apparatus according to claim 8, further having recording means for recording the data multiplexed by said multiplexing means onto the recording medium.

11. An apparatus according to claim 6, further having image pickup means for photographing an object image, thereby obtaining the image data.

12. An image processing apparatus comprising:
a) input means for inputting image data;
b) electronic zooming means for electronically zooming the image data input by said input means;
c) compression encoding means for compression encoding the image data processed by said electronic zooming means; and
d) control means for controlling a zoom magnification ratio of said electronic zooming means, said control means controlling a compression processing of said compression encoding means according to said zoom magnification ratio.

13. An apparatus according to claim 12, wherein said input means includes image pickup means for obtaining the image data.

14. An apparatus according to claim 12, further having recording means for recording the image data encoded by said compression encoding means onto a recording medium.

15. An apparatus according to claim 12, further having display means for displaying the image data enlarged by said enlarging means.

16. An image processing method comprising the steps of:

inputting image data;

compression encoding the input image data;

storing the encoded image data in a memory;

electrically enlarging an image size of the image data stored in said memory; and controlling an enlargement ratio of said enlarging step, said control step controlling a compression processing of said compression encoding step according to said enlargement ratio.

17. An image processing method comprising the steps of:

inputting image data;

electronically zooming the input image data;

compression encoding the zoomed image data; and controlling a zoom magnification ratio of said electronic zooming step, said control step controlling a compression processing of said compression encoding step according to said zoom magnification ratio.

* * * * *